March 11, 1924.
W. E. PRICE
CLAMPING DEVICE
Filed June 20, 1922
1,486,158
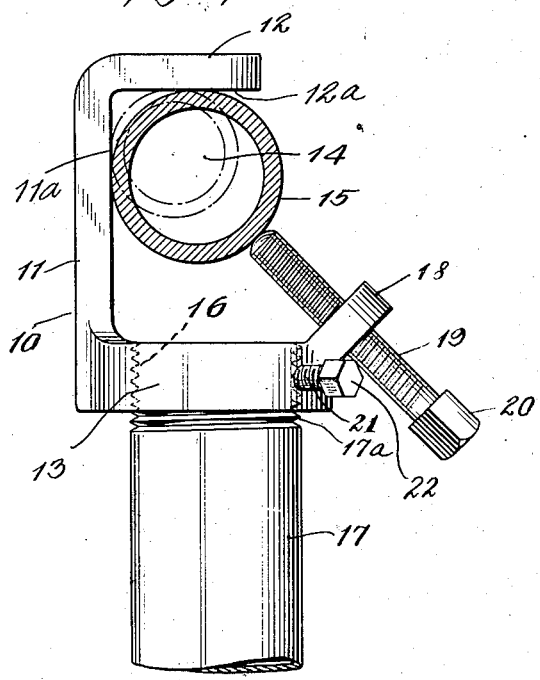
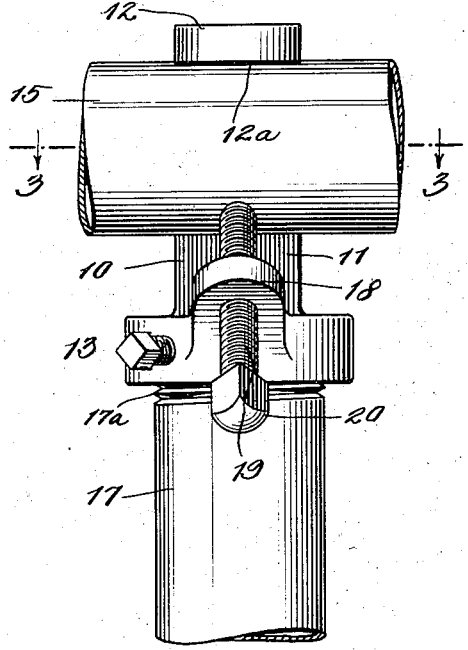
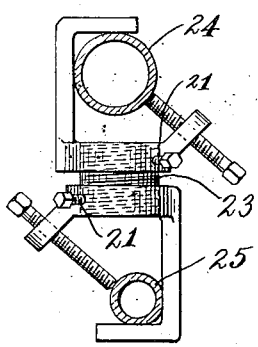
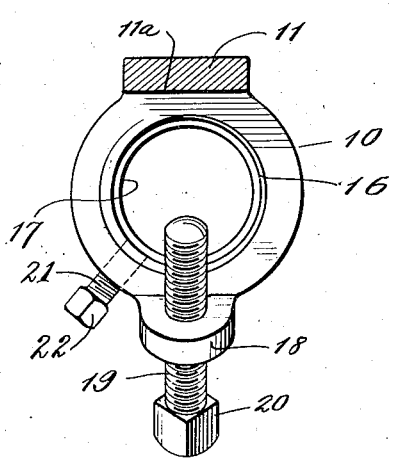
INVENTOR
WILLIAM E. PRICE
BY
ATTORNEY Patented Mar. 11, 1924.

1,486,158

UNITED STATES PATENT OFFICE.

WILLIAM E. PRICE, OF HARTSDALE, NEW YORK.

CLAMPING DEVICE.

Application filed June 20, 1922. Serial No. 569,652.

*To all whom it may concern:*

Be it known that WILLIAM E. PRICE, citizen of the United States, residing at Hartsdale, in the county of Westchester and State of New York, has invented certain new and useful Improvements in Clamping Devices, of which the following is a specification.

This invention relates to clamping devices. More particularly the invention is directed to clamping devices adapted for use in connecting pipe elements, rails and the like supports.

One object of the invention is to provide a simple and practical device of the character described which shall be adapted for use with various sizes of pipe or the like support elements for connecting such elements in various desired positions.

Another object is to provide a device of the character described which shall be comparatively cheap to manufacture, easy to manipulate and efficient in operation to a high degree.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawings, in which is shown one of various possible illustrative embodiments of this invention, Fig. 1 is a front elevational view of a clamp embodying this invention shown in use in clamping a pipe element;

Fig. 2 is an end view corresponding to Fig. 1; and

Fig. 3 is a cross-sectional view cut along line 3—3 of Fig. 2.

Fig. 4 is a front elevational view showing two clamps embodying this invention connected to each other in a manner such as to permit the rotation of one relative to the other so as to dispose the clamps at various angles to each other, the clamps in this figure being arranged in the same plane so that the pipe elements held thereby are parallel to each other; and Fig. 5 is a perspective view showing a pair of clamps embodying this invention similarly connected to each other but disposed so as to have the pipe elements connected thereby at angles to each other.

Referring in detail to the drawings, the clamping device embodying the invention there shown is seen to comprise a substantially C-shaped member 10 having a pair of parallel spaced jaws 12, 13, extending substantially at right angles to the connecting wall 11, and providing a space 14 adapted to receive the pipe element 15, or rail or any other supporting element. The lower jaw 13 is tapped as at 16 to receive another pipe or other connecting member 17 adapted to co-operate with the element 15 in producing the supporting structure with which the clamping device is used. Extending obliquely from the lower jaw 13 and formed preferably integral therewith is a lug 18 threaded to receive a clamping screw member 19 having a head 20 whereby it may be manipulated either manually or by means of a wrench or suitable tool. The pipe element 15 is securely clamped between the clamping screw 19 and the lower face 12$^a$ of the upper jaw and the inner wall 11$^a$ of the vertical member 11 as will be readily understood. By threading the clamping screw 19 in and out of the lug member 18, various sizes of pipe elements may be securely clamped in desired position. In Fig. 1 is shown in dotted lines a smaller size pipe element which may be clamped in position with this invention merely by threading the clamping screw 19 further into the space 14 as will be readily understood.

The C-shaped member 10 is preferably cast in one piece and may be made in various sizes with the thread 16 in the lower jaw member 13 of different standard diameters so as to be adapted for use with various sizes of pipe connections 17 having correspondingly threaded connecting elements 17$^a$ as will be readily understood. It will be clear that with a stock of various sizes of C-shaped members, a wide range of practical application is had, a particular C-shaped member having a thread 16 of a diameter corresponding to the size of the pipe connection 17 being selected as desired.

If desired, an additional clamping screw 21 having an operating head 22 may be provided in the lower jaw 13 so as to operate through an opening therein to engage the connecting member 17, and thus prevent the same from becoming loose in the jaw 13 by unthreading. If a connecting member such as 17 having a threaded portion 17ª should be unavailable, a smooth tubular member might be used, the auxiliary screw 21 serving to hold it in place in the lower jaw 13.

In Fig. 3 there are shown two clamps embodying the invention connected to each other by means of a short threaded nipple 23, each of the clamps holding a pipe element 24, 25. In this figure the two clamps are arranged in the same plane and the pipe elements 24, 25 are parallel to each other. By rotating one of the clamps such as the lower one in the figure about the member 23, the pipe element such as 25 carried thereby will be disposed at any desired angle to the pipe element 24 as will be readily understood. Thus in Fig. 5 are shown two pipe elements clamped at an angle to each other by means of a pair of clamps embodying this invention.

It will thus be seen that there is provided a device in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. In a device of the character described, a pair of spaced jaws, one of said jaws having an opening therein adapted to receive a connecting element, and an angular lug member extending from said jaw and a clamping member adapted to operate in said lug member.

2. In a device of the character described, a pair of spaced jaws, one of said jaws having a threaded opening therein adapted to receive a connecting element, and an angular lug member extending from said jaw and a clamping member adapted to operate in said lug member.

3. A clamping device comprising a substantially C-shaped member having a pair of spaced jaws extending from a connecting wall, one of said jaws having an opening therein adapted to receive a connecting element, and a clamping member operating in said jaw adapted to clamp another connecting element between the other jaw and the connecting wall.

4. A clamping device comprising a substantially C-shaped member having a pair of spaced jaws extending from a connecting wall, one of said jaws having a threaded opening therein adapted to receive a connecting element, and an adjustable clamping member operating in said jaw adapted to clamp another connecting element between the other jaw and the connecting wall.

5. A clamping device comprising a substantially C-shaped member having a pair of spaced jaws extending from a connecting wall, one of said jaws having a threaded opening therein adapted to receive a connecting element, and an angular lug member extending from said jaw, and an adjustable clamp adapted to operate in said lug member to clamp another connecting element between the other jaw and the connecting wall.

In testimony whereof I affix my signature.

WILLIAM E. PRICE.